United States Patent [19]
Tsuruta et al.

[11] Patent Number: 5,626,698
[45] Date of Patent: May 6, 1997

[54] PNEUMATIC RADIAL TIRES WITH STIFFENERS COMPOSED OF THREE STIFFENER MEMBERS

[75] Inventors: Makoto Tsuruta; Yasutoshi Aoki, both of Tokyo, Japan

[73] Assignee: Bridgestone Corporation, Tokyo, Japan

[21] Appl. No.: 496,177

[22] Filed: Jun. 28, 1995

[30] Foreign Application Priority Data

| | | | |
|---|---|---|---|
| Jun. 28, 1994 | [JP] | Japan | 6-146367 |
| Dec. 27, 1994 | [JP] | Japan | 6-337894 |
| Jun. 3, 1995 | [JP] | Japan | 7-159974 |

[51] Int. Cl.$^6$ .............................. B60C 9/02; B60C 9/08; B60C 15/00; B60C 15/06
[52] U.S. Cl. ................. 152/541; 152/539; 152/542; 152/543; 152/546; 152/547; 152/549; 152/552; 152/555
[58] Field of Search .................... 152/539, 549, 152/541–543, 546–547, 552–555

[56] References Cited

U.S. PATENT DOCUMENTS

| | | | |
|---|---|---|---|
| 5,056,575 | 10/1991 | Yamaguchi et al. | 152/541 |
| 5,433,257 | 7/1995 | Yamaguchi et al. | 152/541 X |

FOREIGN PATENT DOCUMENTS

| | | | |
|---|---|---|---|
| 0458633 | 11/1991 | European Pat. Off. | |
| A5-16618 | 1/1993 | Japan. | |
| 5-124408 | 5/1993 | Japan | 152/541 |

OTHER PUBLICATIONS

European Search Report (Dated Nov. 15, 1995).
Patent Abstract's of Japan—English translation of Abstract.

*Primary Examiner*—Adrienne C. Johnstone
*Attorney, Agent, or Firm*—Sughrue, Mion, Zinn, Macpeak & Seas

[57] ABSTRACT

A pneumatic radial tire comprises a pair of bead cores, at least one radial carcass ply comprised of a main body and a turnup portion, and a stiffener arranged between the main body and each turnup portion wound around each bead core, in which each stiffener is composed of first, second and third stiffener members, and a boundary surface X between the first and second stiffener members is inclined outward in the radial direction so as to approach to the main body and a boundary surface Y between the second and third stiffener members is inclined outward in the radial direction so as to separate away from the main body, and a ply end rubber member made from rubber having a hardness between the hardnesses of the first and third stiffener members is arranged on an outer end region of the turnup portion in the radial direction.

19 Claims, 8 Drawing Sheets

FIG_6
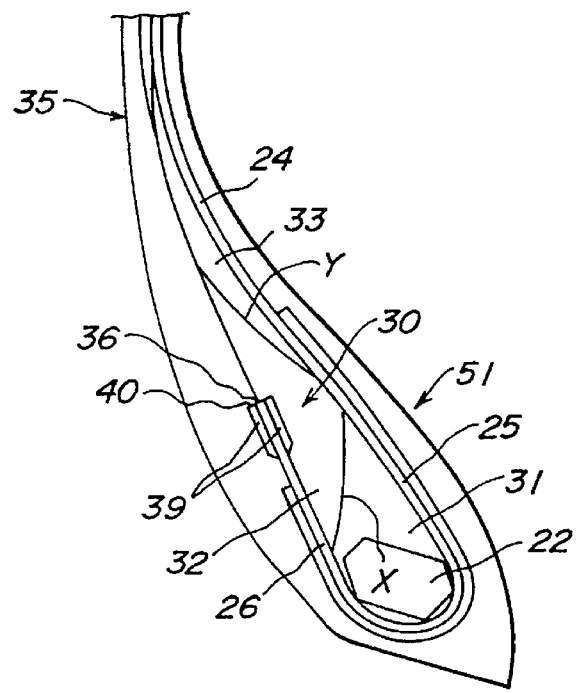
FIG_7
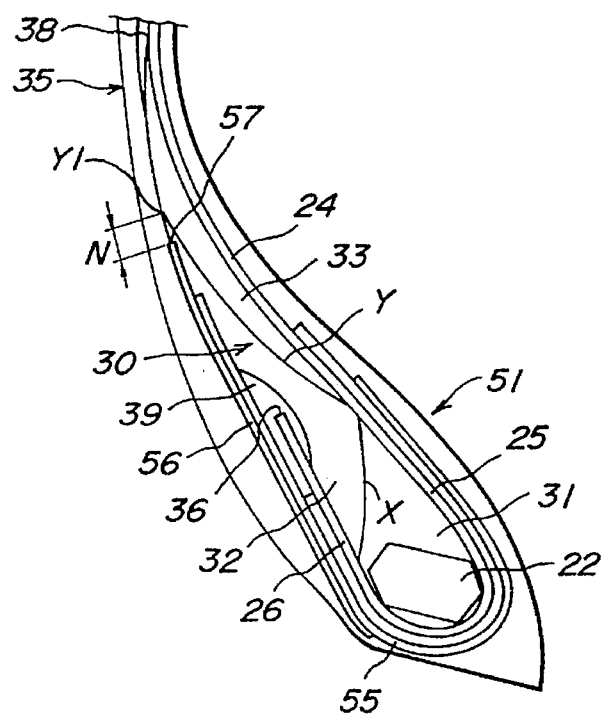

FIG. 8
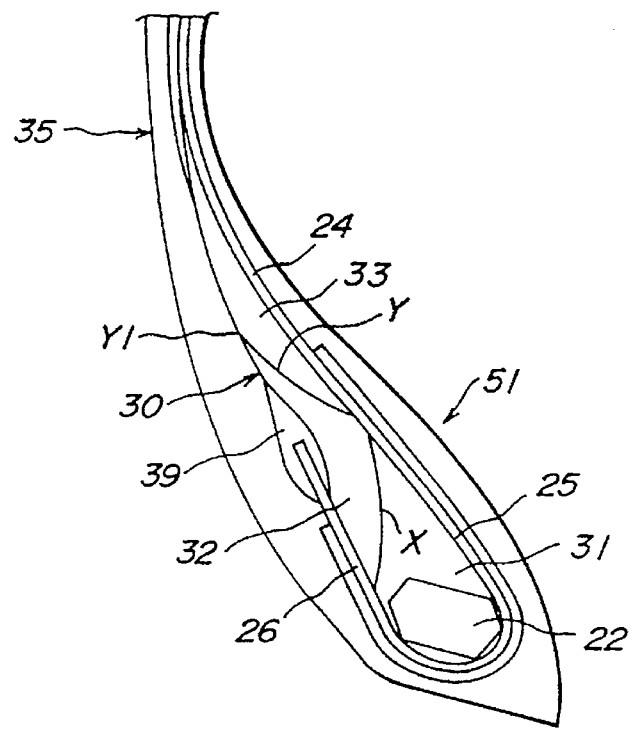
FIG. 9 COMPARATIVE
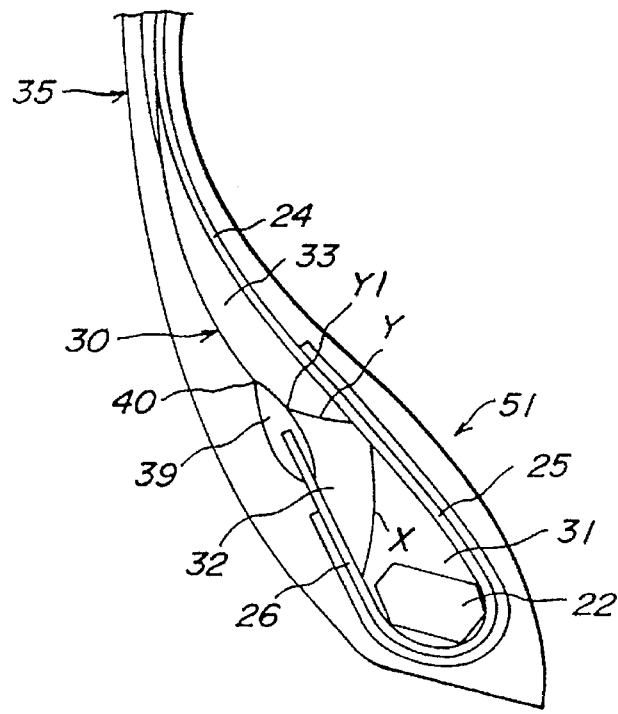

FIG_10 PRIOR ART
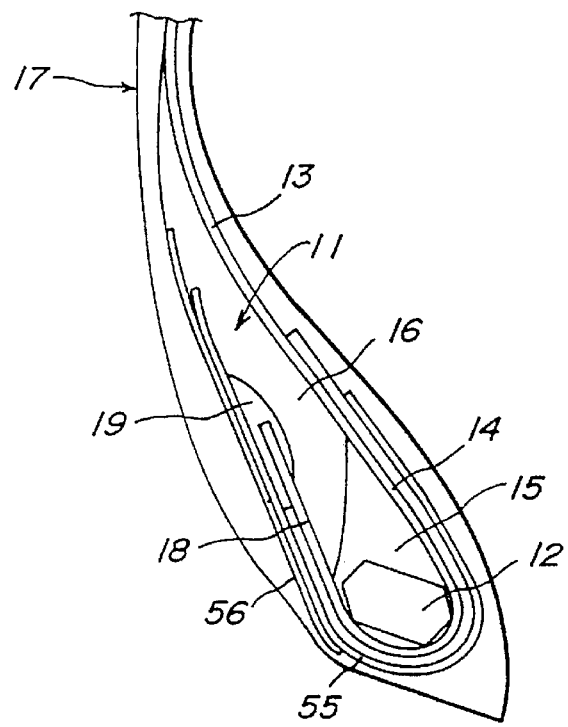
FIG_11 COMPARATIVE
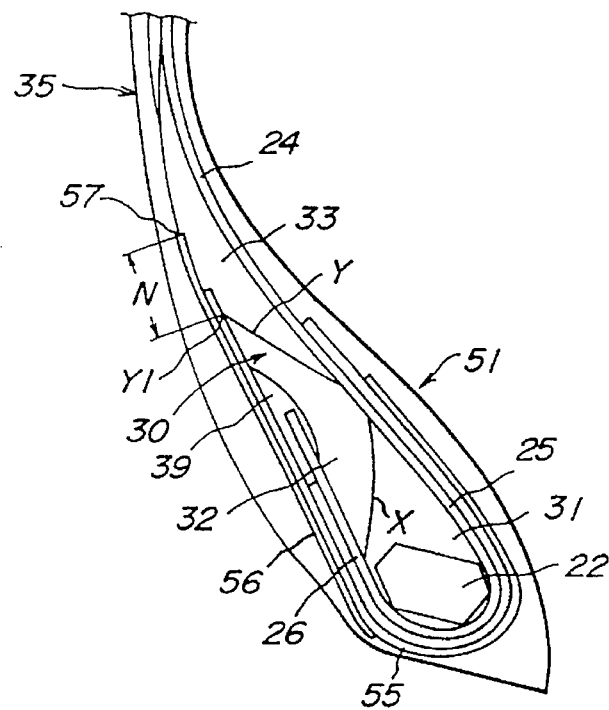

5,626,698

1

PNEUMATIC RADIAL TIRES WITH STIFFENERS COMPOSED OF THREE STIFFENER MEMBERS

BACKGROUND OF THE INVENTION

1. Field of the Invention

This invention relates to pneumatic radial tires having improved durability in the bead portion.

2. Description of the Related Art

In general, when a pneumatic radial tire is run under loading, a ground contact portion of the tire is subjected to a reaction force from a road surface against the loading, so that a sidewall portion adjacent to the ground contact portion is subjected to deflective deformation, which is transmitted to a bead portion. As a result, compression strain is created in an outer region of the bead portion in an axial direction of the tire, and particularly a large compression strain is created in the vicinity of an outer end of a turnup portion of a carcass ply in a radial direction of the tire. Additionally, the compression strain created by such a deflective deformation promotes a pulling phenomenon of the carcass ply toward a main body side thereof due to inflation under an internal pressure. This in turn produces cracking in rubber surrounding the outer end region of the turnup portion in the radial direction to finally cause separation failure bringing about tire trouble.

In order to control such a compression strain, there has hitherto been proposed a tire as shown in FIG. 12. In the tire of FIG. 12, a stiffener 11 is arranged on a bead core 12 and comprised of a hard stiffener member 15 made from a hard rubber having a substantially triangular shape, which extends substantially outward from the bead core 12 in the radial direction while closely adhering to a main body 14 of a carcass ply 13. A soft stiffener member 16 is made from a soft rubber arranged outward on the hard stiffener member 15 in the radial direction. Thus, the deflective deformation of a sidewall portion 17 creating the compression strain is controlled by the hard stiffener member 15, while the compression strain is mitigated and absorbed by the soft stiffener member 16 to control strain concentration in the outer end region of a turnup portion 18 of the carcass ply 13 in the radial direction. Furthermore, a ply end rubber member 19 made from rubber having a good resistance to cracking growth is arranged in the outer end region of the turnup portion 18 in the radial direction, whereby strain is mitigated in the outer end region to control the occurrence of cracking. In this way, attemps to improve the durability in the bead portion have been made.

In this tire, the bead portion durability is improved to a certain extent. Lately, it is demanded to further improve bead portion durability because the aspect ratio of the tire is becoming lower and longer service life of the tire (inclusive of retreading) is being required for the commercial market.

For this end, the inventors have made various studies with respect to tires satisfying the above requirements and confirmed that the cracking produced in the outer end region of the turnup portion 18 in the radial direction is created by the following cause in addition to the compression strain based on the deflective deformation of the sidewall portion 17 as mentioned above. That is, when the tire is run under loading, the tread portion is forcedly pushed inward in the radial direction at the ground contact area of the tire to expandedly deform the sidewall portion 17 at the ground contact area outward in the widthwise direction. In this case, the degree of deformation in the vicinity of stepping-in side end and kicking-out side end is larger than the degree of deformation in the other region of the ground contact area. Hence, the sidewall portion 17 is torsionally deformed and particularly a large torsional deformation is caused in the vicinity of a position of a maximum tire width. Such a torsional deformation is transmitted to the ply end rubber member 19 arranged in the outer end region of the turnup portion 18 of the carcass ply 13 in the radial direction, whereby cracking is created in the ply end rubber member 19.

In order to control the transmission of torsional deformation to the ply end rubber member 19, it has been confirmed that it is effective to mitigate and absorb torsional deformation on the way of transmission with the soft stiffener member 16 by decreasing the hardness of the soft rubber stiffener member 16.

However, when deformation is facilitated by decreasing the hardness of the soft stiffener member 16 as mentioned above, the soft stiffener member 16 sandwiched between the main body 14 and the turnup portion 18 of the carcass ply 13 is crushed in the thickness direction by compression force based on the internal pressure filling in the tire to cause a large flow deformation outward in the radial direction. Hence, the ply end rubber member 19 is deformed following such a flow deformation, whereby the effect inherent to the ply end rubber member 19 for mitigating the strain in the outer end region of the turnup portion 18 in the radial direction can not sufficiently be developed.

SUMMARY OF THE INVENTION

It is, therefore, an object of the invention to provide pneumatic radial tires having an improved durability in bead portion which are capable of effectively controlling the occurrence of cracking based on the deflective deformation and torsional deformation during the running under loading and the flow deformation in the inflation under the internal pressure.

According to the invention, there is the provision of a pneumatic radial tire comprising a pair of bead cores, at least one radial carcass ply comprised of a main body extending between the bead cores and a turnup portion wound around each bead core from inside toward outside, and a stiffener arranged between the main body and each turnup portion of the carcass ply and extending from the bead core along the main body outward in substantially a radial direction of the tire, in which the stiffener is composed of first, second and third stiffener members successively arranged from inside toward outside in the radial direction and made from rubbers being lower in hardness in this order, and a boundary surface X between the first and second stiffener members is inclined outward in the radial direction to approach the main body and a boundary surface Y between the second and third stiffener members is inclined outward in the radial direction to separate away from the main body, and a ply end rubber member made from rubber having a hardness between the hardnesses of the first and third stiffener members is arranged on an outer end region of the turnup portion in the radial direction, and an outer end Y1 of the boundary surface Y between the second and third stiffener members in the radial direction is located outward from an outer end of the ply end rubber member in the radial direction and an inner end X1 of the boundary surface X between the first and second stiffener members in the radial direction is located inward from an outer end of the turnup portion in the radial direction.

BRIEF DESCRIPTION OF THE DRAWINGS

The invention will be described with reference to the accompanying drawings, wherein:

FIG. 6 is a schematically radial section view of a fourth embodiment of the bead portion in the pneumatic radial tire according to the invention;

FIG. 7 is a schematically radial section view of a fifth embodiment of the bead portion in the pneumatic radial tire according to the invention;

FIG. 8 is a schematically radial section view of the bead portion in an acceptable tire 5 used in a test;

FIG. 9 is a schematically radial section view of the bead portion in a comparative tire 1 used in a test;

FIG. 10 is a schematically radial section view of the bead portion in the conventional tire 3 used in a test;

FIG. 11 is a schematically radial section view of the bead portion in a comparative tire 2 used in a test.

DESCRIPTION OF THE PREFERRED EMBODIMENTS

Figure 1:
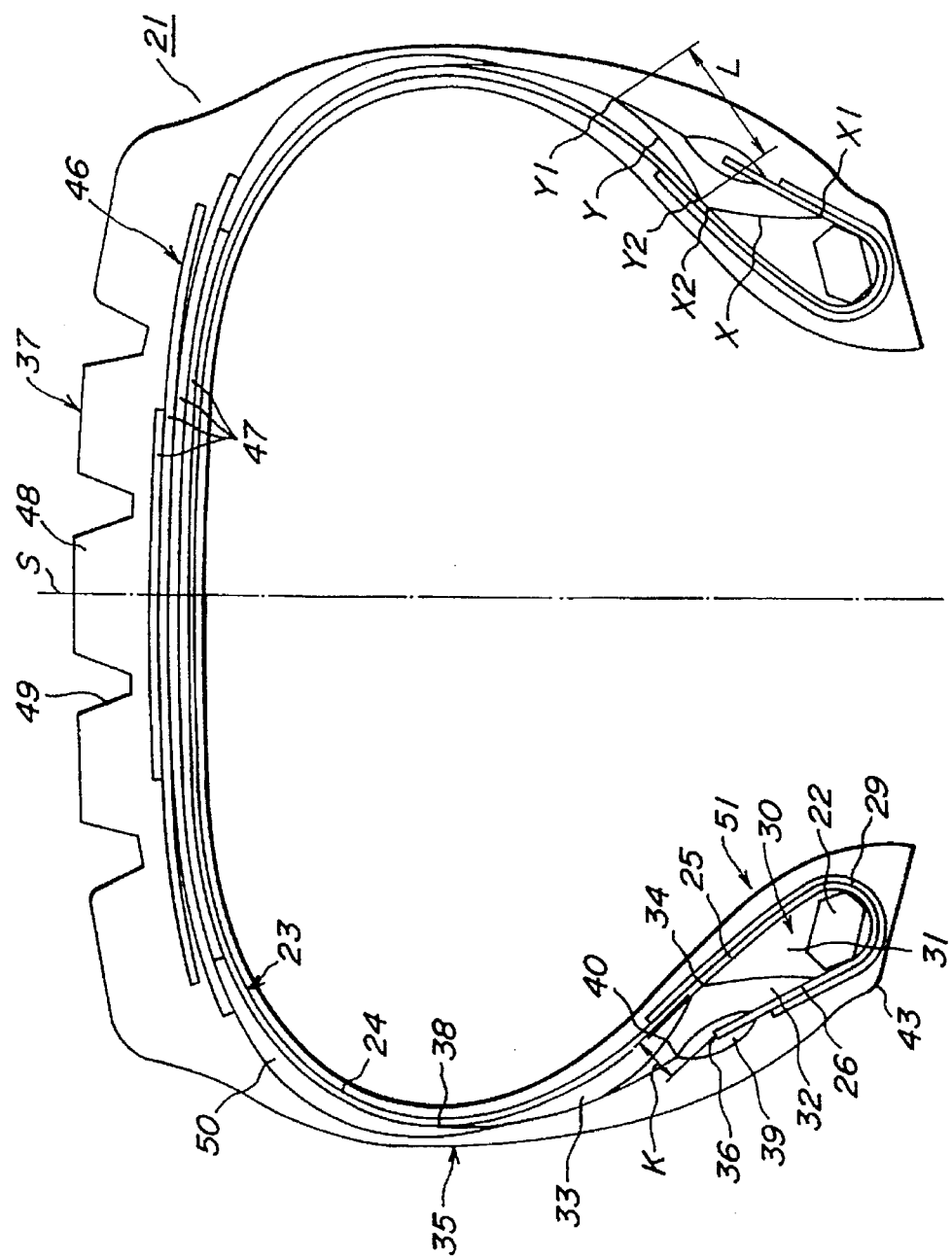
FIG. 1 is a schematically radial section view of a first embodiment of the pneumatic radial tire according to the invention.

In the pneumatic radial tire according to the invention, a stiffener is arranged between the main body and each turnup portion of the radially outermost carcass ply on the bead core from inside toward outside in the radial direction of the tire and composed of first to third stiffener members being lower in the hardness in this order. The first stiffener member having a higher hardness is located inward in the radial direction and the boundary surface X between the first and second stiffener members is inclined outward in the radial direction to approach the main body of the carcass ply or the first stiffener member is unevenly distributed side the main body of the carcass ply.

Thus deflective deformation in the sidewall portion is controlled to reduce the compression strain in the vicinity of the outer end of the turnup portion in radial direction when the tire is run under loading. In this case, if the first stiffener member is located in the vicinity of the outer end of the turnup portion in the radial direction, movement of the turnup portion is restricted by the first stiffener member made from rubber having a higher hardness to transmit torsional deformation to the outer end region of the turnup portion in the radial direction. According to the invention, therefore, the inner end X1 of the boundary surface X between the first and second stiffener members in the radial direction is located inward from the outer end of the turnup portion in the radial direction to restrict the movement of the turnup portion.

Furthermore, the third stiffener member made from rubber having a lower hardness is arranged outward in the radial direction, so that the torsional deformation in the sidewall portion is mitigated and absorbed by the third stiffener member on the way of transmission to further reduce the strain in the vicinity of the outer end of the turnup portion in the radial direction. In order to more strongly conduct the mitigation and absorption of these deformations, it is sufficient to increase an occupying volume of the third stiffener member in the whole of the stiffener. However, the outer end Y1 of the boundary surface Y between the second and third stiffener members in the radial direction is restricted to be located outward from the outer end of the ply end rubber member in the radial direction, so that the boundary surface Y between the second and third stiffener members is inclined outward in the radial direction to separate away from the main body of the carcass ply to increase the occupying volume of the third stiffener member. Furthermore, the ply end rubber member made from rubber having a hardness between those of the first and third stiffener members is arranged in the outer end region of the turnup portion in the radial direction, therefore the strain produced in the outer end region of the turnup portion in the radial direction can be mitigated to effectively control the occurrence of the cracking and the growth thereof.

Moreover, the second stiffener member made from rubber having a middle hardness is arranged in a central zone of the stiffener in the radial direction between the first and third stiffener members. Thus the flow deformation of rubber between the main body and the turnup portion of the carcass ply outward in the radial direction is decreased compared with the case that rubber having a low hardness is interposed between the main body and the turnup portion of the carcass ply and hence the deformation of the ply end rubber member following flow deformation is decreased. Particularly, the flow deformation of a zone located outward from the outer end of the turnup portion in the radial direction is larger in the turnup portion side than in the main body side because the ply restricting the deformation is not existent. In order to effectively control the large flow deformation at the turnup portion side, the boundary surface Y between the second and third stiffener members is inclined outward in the radial direction to separate away from the main body of the carcass ply, whereby the first and second stiffener members of rubbers having a hardness larger than that of the third stiffener member are unevenly distributed toward the turnup portion side. Further, the outer end Y1 of the boundary surface Y between the second and third stiffener members in the radial direction is located outward from the outer end of the ply end rubber member in the radial direction, whereby the ply end rubber member is separated away from the third stiffener member largely causing the flow deformation outward in the radial direction owing to the lower hardness to restrict the followability of the ply end rubber member to the flow deformation of the third stiffener member. According to the invention, therefore, the occurrence of cracking based on the deflective deformation and torsional deformation during running under loading and the flow deformation in the inflation under the internal pressure can effectively be controlled.

In a preferable embodiment of the invention, a length L is measured along the boundary surface Y between the second and third stiffener members and is not less than 2.0 times a vertical distance K which is the normal distance from the midpoint of the outer end of the turnup portion in the radial direction to the midpoint of the main body of the carcass ply as illustrated. When the length L of the boundary surface Y becomes longer, shearing strain at the boundary surface Y between the second and third stiffener members can effectively be mitigated, whereby cracking generated under a heavy loading can be prevented at the boundary surface Y.

The outer end of the third stiffener member in the radial direction is located outward from a point P on the radially outermost carcass ply main body and corresponding to 0.8 times a height H of a maximum width of the carcass ply in the inflation under a normal internal pressure to extend to the vicinity of the position of the maximum tire width, whereby the torsional deformation being maximum in the vicinity of the position of the maximum tire width can be effectively absorbed.

In order to surely develop the aforementioned effect, the Shore A hardness of the first stiffener member is not less than 70°, and that of the second stiffener member is within a range of 58° to 68°, and that of the third stiffener member is not more than 55°. When the Shore A hardness of the third stiffener member exceeds 55°, torsional deformation can not effectively be absorbed. When the Shore A hardness of the second stiffener member is less than 58°, flow deformation can not effectively be controlled, while when it exceeds 68°, torsional deformation can not effectively be absorbed. When the Shore A hardness of the first stiffener member is less than 70°, the deflective deformation generated in the sidewall portion during running under loading can not be effectively controlled and also the pulling of the carcass ply in the inflation under the internal pressure can not be effectively controlled.

When the volume percentage J of the third stiffener member occupying in the stiffener is not less than 10%, and further when a ratio of volume B of the second stiffener member to volume C of the third stiffener member C is within a range of 0.8-2.5, the aforementioned effect can be surely developed. On the contrary, when the volume percentage J is less than 10%, the occupying volume of the third stiffener member becomes small and the torsional deformation can not be sufficiently mitigated and absorbed. Furthermore, when the volume ratio B/C is less than 0.8, the occupying volume of the second stiffener member to the third stiffener member becomes relatively smaller and the outward flow deformation in the radial direction can not effectively be controlled. When it exceeds 2.5, the occupying volume of the third stiffener member to the second stiffener member becomes relatively smaller and torsional deformation can not sufficiently be mitigated and absorbed.

When the pneumatic radial tire according to the invention is run under a heavy loading, a large deformation based on the running is created in the inside of the first stiffener member, which gradually becomes large in accordance with a case that the restraint by the bead core becomes weak or a portion of the stiffener separates away from the bead core. In the invention, the boundary surface X between the first and second stiffener members is inclined outward in the radial direction to approach to the main body of the carcass ply, so that the deformation becomes maximum at the outer end region of the first stiffener member contacting with the main body in the radial direction. As a result, a large shearing strain is generated at such a region between the first stiffener member and the main body. When such a shearing strain is applied over a long period, there is caused a fear of generating separation failure between the main body (that is, a coating rubber for the carcass ply) and the outer end region of the first stiffener member contacting with the main body in the radial direction. According to the invention, therefore, a cushion rubber layer having a hardness lower than that of the first stiffener member is arranged between the main body of the carcass ply and the outer end region of the first stiffener member in the radial direction, whereby the above shearing strain may be mitigated and absorbed to effectively control the occurrence of separation failure.

The cushion rubber layer is made from the same rubber as used in the third stiffener member and the third stiffener member is extended inward in the radial direction and interposed between the main body of the carcass ply and the outer end region of the first stiffener member in the radial direction, whereby the work of adhering the rubber layer as the cushion rubber layer is eliminated and the tire building operation is simplified.

When a distance Q from an inner end of the cushion rubber layer to the outer end of the first stiffener member along the main body of the carcass ply in the radial direction is within a range of 3–20 mm, the shearing strain can be effectively controlled without adversely affecting the tire properties. If the distance Q is less than 3 mm, the shearing strain can not be sufficiently buffered, while if it exceeds 20 mm, since the cushion rubber layer having a hardness lower than that of the first stiffener member is extended to the vicinity of the bead core, the deformation of pulling the carcass ply due to the rotation of the bead core in the inflation under the internal pressure is increased and further promoted by repetitive fatigue during the running under loading and hence it is apt to cause the separation failure from the outer end region of the turnup portion in the radial direction.

When a thickness T of the cushion rubber layer is within a range of 1–10 mm between the main body and the outer end of the first stiffener member in the radial direction, the shearing strain can be effectively controlled without badly affecting the tire properties. If the thickness T is less than 1 mm, the shearing strain can not be sufficiently buffered. If it exceeds 10 mm, the volume of the cushion rubber layer having a hardness lower than that of the first stiffener member is relatively increased and the rigidity of the bead portion as a whole lowers.

When the outer end of the turnup portion in the radial direction is located in a central zone of the second stiffener member in the radial direction, the ply end rubber member can be separated away from the first and third stiffener members by an approximately equal distance, whereby the bad influence on the ply end rubber member can be controlled at minimum.

Furthermore, the amount of expensive rubber used in the ply end rubber member can be decreased by matching the outer end to the ply end rubber member in the radial direction with the outer end of the turnup portion in the radial direction.

Moreover, the durability in the bead portion can be further improved by arranging a few number of textile chafers along the turnup portion so as to cover the outer end of the turnup portion in the radial direction. In this case, the outer end of any textile chafer in the radial direction is located inward from the outer end Y1 of the boundary surface Y between the second and third stiffener members in the radial direction, whereby the outer end of any textile chafer in the radial direction separates away from the third stiffener member causing the flow deformation outward in the radial direction due to the lower hardness to control the formation of trouble nucleus in the outer end of the textile chafer in the radial direction under an influence of flow deformation.

Figure 2:
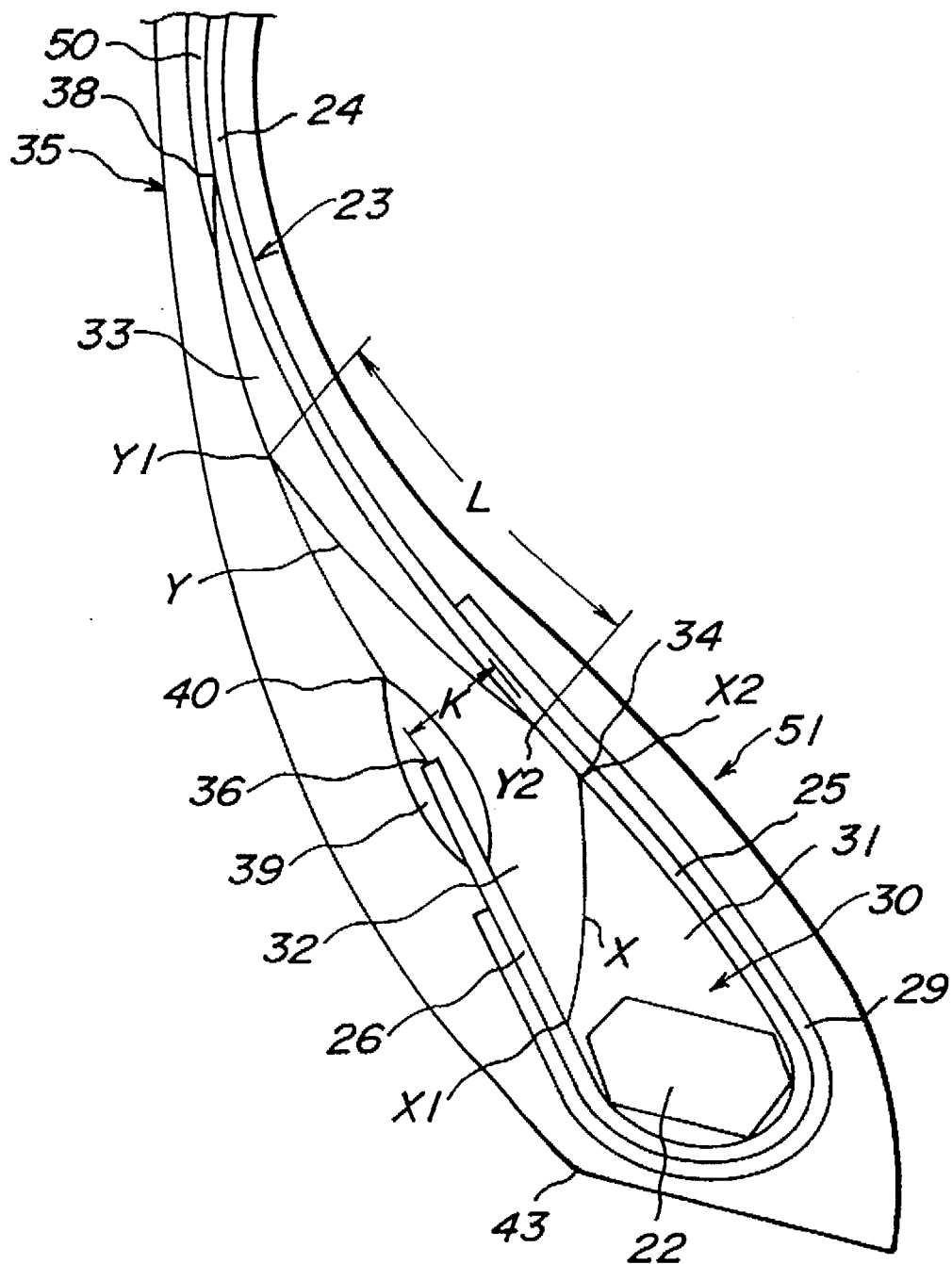
FIG. 2 is a schematically enlarged section view of a bead portion in the first embodiment.

In FIGS. 1 and 2 is shown a first embodiment of the pneumatic radial tire according to the invention. The tire 21 comprises a pair of bead cores 22, and a radial carcass 23 of at least one rubberized carcass ply 24 (one carcass ply in the illustrated embodiment). The carcass ply 24 is comprised of a main body 25 toroidally is extending between the bead cores 22 and a turnup portion 26 wound around each of the bead cores 22 from inside toward outside to extend substantially in parallel to the main body 25 outward in the radial direction of the tire. Furthermore, the carcass ply 24 contains a plurality of steel cords arranged in a direction perpendicular to an equatorial plane (or in the radial direction). Moreover, a wire chafer 29 is arranged outside an inner end region of the main body 25 in the radial direction and the turnup portion 26 to surround the bead core 22, in which a plurality of steel wires are embedded in the wire chafer 29 to incline at a given angle with respect to the radial direction (60° in the illustrated embodiment).

Numeral 30 is a stiffener substantially extending outward from the bead core 22 along the main body 25 in the radial direction. The stiffener 30 is made from rubber having good breaking strength and heat resistance. The inner portion of the stiffener 30 in the radial direction is disposed between the main body 25 and the turnup portion 26 of the carcass ply at a state of closing thereto, while the outer portion of the stiffener 30 in the radial direction is disposed outward from the main body 25 in the axial direction at a state of closing thereto. The stiflenet 30 is composed of a first stiffener member 31, a second stiffener member 32 located outward from the first stiffener member 31 in the radial direction, and a third stiffener member 33 located outward from the second stiffener member 32 in the radial direction. The first stiffener member 31 is made from rubber having a Shore A hardness of not less than 70° (84° in the illustrated embodiment), while the third stiffener member 33 is made from rubber having a Shore A hardness of not more than 55° (49° in the illustrated embodiment) and the second stiffener member 32 is made from rubber having a Shore A hardness of 58°–68° (63° in the illustrated embodiment) or from rubber having a middle hardness between the first and third stiffener members 31, 33. That is, the stiffener 30 is composed of the first, second and third stiffener members 31, 32, 33 successively arranged from the inside toward outside in the radial direction and made from rubbers being lower in the hardness in this order.

When the Shore A hardness of the first stiffener member 31 is less than 70°, the deflective deformation generated in a sidewall portion 35 of the tire 21 during running under loading can not be effectively controlled and also the pulling of the carcass ply 24 in the inflation under the internal pressure can not be effectively controlled. When the Shore A hardness of the third stiffener member 33 exceeds 55°, the torsional deformation can not be effectively absorbed. When the Shore A hardness of the second stiffener member 32 is less than 58°, the outward flow deformation of rubber between the main body 25 and the turnup portion 26 in the radial direction can not be effectively controlled. When it exceeds 68°, the torsional deformation based on a local deformation of a tread portion 37 during the running under loading can not effectively be controlled.

Numeral 39 is a ply end rubber member arranged in the outer end region of the turnup portion 26 in the radial direction so as to cover this region, which is made from rubber having a good resistance to cracking growth for controlling the occurrence of cracking at the above region. Further, the ply end rubber member 39 is made from rubber having a hardness between those of the first and third stiffener members 31, 33 (Shore A hardness of 68° in the illustrated embodiment) or rubber having a hardness close to that of the second stiffener member 32.

The boundary surface X between the first and second stiffener members 31, 32 is inclined outward in the radial direction to approach to the main body 25 or the first stiffener member 31 extends outward in the radial direction while gradually decreasing the thickness of the first stiffener member 31 at radial section. Furthermore, the inner end X1 of the boundary surface X in the radial direction (outer end in axial direction) is located inward from an outer end 36 of the turnup portion 26 or an inner end of the ply end rubber member 39 (in the illustrated embodiment) in the radial direction to contact with the turnup portion 26 in the vicinity of the bead core 22. Moreover, the outer end X2 (34) of the boundary surface X in the radial direction is substantially the same position as in the outer end 36 of the turnup portion 26 in the radial direction.

On the other hand, the boundary surface Y between the second and third stiffener members 32, 33 is inclined outward in the radial direction so as to separate away from the main body 25, and an outer end Y1 of the boundary surface Y in the radial direction is located outward from an outer end 40 of the ply end rubber member 39 in the radial direction. Furthermore, an inner end Y2 of the boundary surface Y in the radial direction is located slightly outward from the outer end X2 of the boundary surface X in the radial direction, and consequently the inner end Y2 in the radial direction is substantially the same position as in the outer end 36 of the turnup portion 26 in the radial direction. The outer end 36 of the turnup portion 26 in the radial direction is located in the central zone of the second stiffener member 32 in the radial direction, so that the ply end rubber member 39 arranged on the outer end region of the turnup portion 26 in the radial direction is separated away from the first and third stiffener members 31, 33 by an approximately equal distance, whereby the bad influence of the first and third stiffener members 31, 33 upon the ply end rubber member 39 can be suppressed at minimum.

It is preferable that the length L of the boundary surface Y at radial section is not less than 2.0 times a vertical distance K from the outer end 36 of the turnup portion 26 in the radial direction to the main body 25 of the carcass ply. Because the shearing strain at the boundary surface Y can be effectively mitigated as the length L becomes longer, whereby the cracking at the boundary surface Y, which has been generated during the running under a heavy loading, can particularly be controlled.

Figure 3:
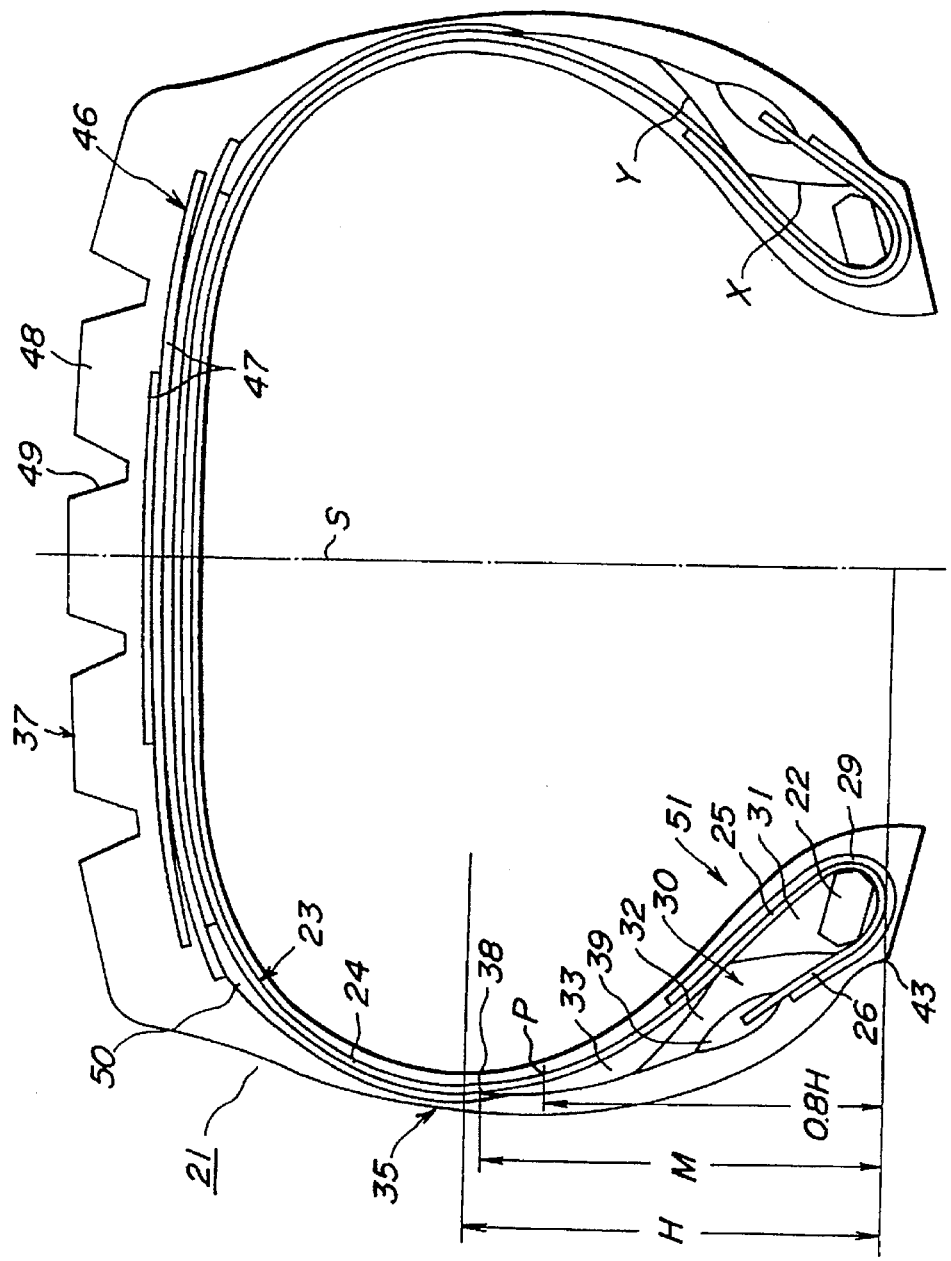
FIG. 3 is a schematically radial section view of the first embodiment in an inflation under a normal internal pressure.

As shown in FIG. 3, when a height of a maximum width of the carcass at a state of inflation under a normal internal pressure is H as measured from a bead heel 43, an outer end 38 of the third stiffener member 33 in the radial direction is preferable to be located outward from a point P corresponding to 0.8 times of the height H in the radial direction. That is, the torsional deformation is a maximum in the vicinity of the position of the maximum tire width and can effectively be absorbed by extending the third stiffener member 33 to the vicinity of the position of the maximum width. The term "height of the maximum carcass width H" used herein means a radial distance measured from the bead heel 43 corresponding to a rim diameter to the position of the maximum carcass width in the inflation under the normal internal pressure. Moreover, the radial distance M from the bead heel 43 to the outer end 38 of the third stiffener member 33 in the radial direction is 0.95 times of the maximum carcass width H in the illustrated embodiment.

Furthermore, it is favorable that the volume percentage J of the third stiffener member 33 occupying in the stiffener as a whole is not less than 10%. When the volume percentage J is less than 10%, the occupying volume of the third stiffener member to the stiffener 30 becomes small and the torsional deformation can not be sufficiently mitigated and absorbed. Further, when the volumes of the second and third stiffener members 32 and 33 are B and C, respectively, a ratio of B/C is preferably within a range of 0.8–2.5. When the ratio B/C is less than 0.8, the occupying volume of the second stiffener member 32 to the third stiffener member 33 becomes relatively smaller and the outward flow deformation in the radial direction can not be effectively be controlled. When the ratio B/C exceeds 2.5, the occupying volume of the third stiffener member 33 to the second stiffener member 32 becomes relatively smaller and the torsional deformation can not be sufficiently be mitigated and absorbed.

A belt 46 is disposed outward on the carcass 23 in the radial direction and is composed of at least two belt layers 47 (4 belt layers in the illustrated embodiment) each containing inextensible cords therein. The cords embedded in the belt layer 47 are inclined at a given cord angle with respect to an equatorial plane S of the tire, and the cords of the belt layers are crossed with each other. A tread rubber 48 is disposed outward on the belt 46 in the radial direction and a plurality of main grooves 49 extending circumferentially of the tire (4 main grooves in the illustrated embodiment) and a plurality of lateral grooves (not shown) crossing with the main grooves are formed on the outer surface of the tread rubber 48.

Numeral 50 is a cushion rubber member arranged on each side of the carcass ply 24 in the widthwise direction, in which an outer end of the cushion rubber member 50 in the radial direction is positioned between a widthwise end region of the widest belt layer 47 and the carcass ply 24 and an inner end thereof in the radial direction is piled on the outer end region of the third stiffener member 33 in the radial direction at the outside thereof in the axial direction in the vicinity of the position of the maximum tire width. Such piling corresponds to a presetting state of the stiffener 30 and the cushion rubber member 50 stuck on a tire building drum at a tire building step.

The function of the first embodiment according to the invention will be described below.

When the tire 21 is run under load, the sidewall portion 35 adjacent to the ground contact area of the tire 21 is subjected to deflective deformation by loading and such a deformation is transmitted to a bead portion 51 to create a large compression strain in the outer region of the bead portion 51 in the axial direction of the tire, particularly in the vicinity of the outer end 36 of the turnup portion 26 in the radial direction. Also the compression strain created by such a deflective deformation promotes the pulling phenomenon of the carcass ply 24 toward the main body 25 thereof based on the inflation of the internal pressure, which may cause the cracking of rubber surrounding the outer end region of the turnup portion 26 in the radial direction. Furthermore, the tread portion 37 located in the ground contact area is forcedly pushed into the inside of the tread portion 37 in the radial direction during running, so that the sidewall portion 35 at the ground contact area is deformed to expand outward in the widthwise direction. In the latter case, since the deformation degree at the stepping-in side end and kicking-out side end is larger than that in the other remaining region of the ground contact area, the sidewall portion 35 is subjected to torsional deformation. In particular a large torsional deformation is caused in the vicinity of the position of the maximum tire width, which is transmitted to the ply end rubber member 39 to cause a fear of cracking the ply end rubber member 39. Moreover, the stiffener 30 disposed between the main body 25 and the turnup portion 26 of the carcass ply is crushed in the thickness direction by compression force based on the internal pressure filled in tire 21 to cause the flow deformation outward in the radial direction. The ply end rubber member 39 is deformed following flow deformation, and consequently the effect inherent to the ply end rubber member can not sufficiently be developed.

In the illustrated embodiment, however, the first stiffener member 31 is arranged in the inner region of the stiffener 30 in the radial direction, while the boundary surface X between the first and second stiffener members 31, 32 is inclined outward in the radial direction to approach to the main body 25, so that the first stiffener member 31 made from rubber having a higher hardness is unevenly distributed side the main body 25, whereby the deflective deformation in the sidewall portion 35 is controlled to decrease the compression strain in the vicinity of the outer end 36 of the turnup portion 26 in the radial direction. In this case, if the first stiffener member 31 is located in the vicinity of the outer end 36 of the turnup portion 26 in the radial direction, the movement of the turnup portion 26 is restricted by the first stiffener member 31 made from rubber having a higher hardness and the torsional deformation is transmitted to the outer end region of the turnup portion 26 in the radial direction. For this end, the inner end X1 of the boundary surface X between the first and second stiffener members 31, 32 in the radial direction is located inward from the outer end 36 of the turnup portion 26 in the radial direction, whereby the movement of the turnup portion 26 is free.

Since the third stiffener member 33 is located in the outer portion of the stiffener 30 in the radial direction, the torsional deformation in the sidewall portion 35 is mitigated and absorbed by the third stiffener member 33 made from rubber having a lower hardness on the way of transmission, whereby the strain in the vicinity of the outer end 36 of the turnup portion 26 in the radial direction is further decreased. In order to strongly conduct the mitigation and absorption of such a deformation, the occupying volume of the third stiffener member 33 is made large compared to the whole of the stiffener 30. However, the outer end Y1 of the boundary surface Y between the second and third stiffener members 32, 33 in the radial direction is restricted to locate outward from the outer end 40 of the ply end rubber member 39 in the radial direction, so that the boundary surface Y is inclined outward in the radial direction so as to separate away from the main body 25. As a result the occupying volume of the third stiffener member 33 is increased to ensure the mitigation and absorption.

Since the ply end rubber member 39 is arranged on the outer end region of the turnup portion 26 in the radial direction, the strain created in the outer end region of the turnup portion 26 in the radial direction is mitigated to effectively control the occurrence of cracking and the growth thereof. Further, the first stiffener member 31 made from rubber having a higher hardness is arranged in the inner region of the stiffener 30 in the radial direction and the second stiffener member 32 having a middle hardness is arranged in the central region of the stiffener 30 in the radial direction, so that the outward flow deformation of rubber between the main body 25 and the turnup portion 26 in the radial direction is reduced as compared with the case that rubber having a lower hardness is interposed into a space between the main body 25 and the turnup portion 26. As a result the deformation amount of the ply end rubber member 39 following the flow deformation is decreased. Moreover, the flow deformation, particularly the outward flow deformation from the outer end region of the turnup portion 26 in the radial direction becomes larger in the turnup portion side than in the main body side because there is no ply restricting the deformation, so that in the illustrated embodiment, the first and second stiffener members 31, 32 made from rubbers having a hardness higher than that of the third stiffener member 33 are unevenly distributed toward the side of the turnup portion 26 by inclining the boundary surface Y outward in the radial direction so as to separate away from the main body 25. As a result the large flow deformation at the side of the turnup portion 26 is effectively controlled. Additionally, the outer end Y1 of the boundary surface Y in the radial direction is located outward from the outer end 40 of the ply end rubber member 39 in the radial direction, whereby the ply end rubber member 39 is surely separated away from the third stiffener member 33 causing the large flow deformation outward in the radial direction due to low hardness to restrict the movement of the ply end rubber member 39 following the flow deformation of the third stiffener member 33. Thus, the occurrence of cracking based on the deflective deformation and torsional deformation during the running under loading and the flow deformation in the inflation under internal pressure can effectively be controlled.

Figure 4:
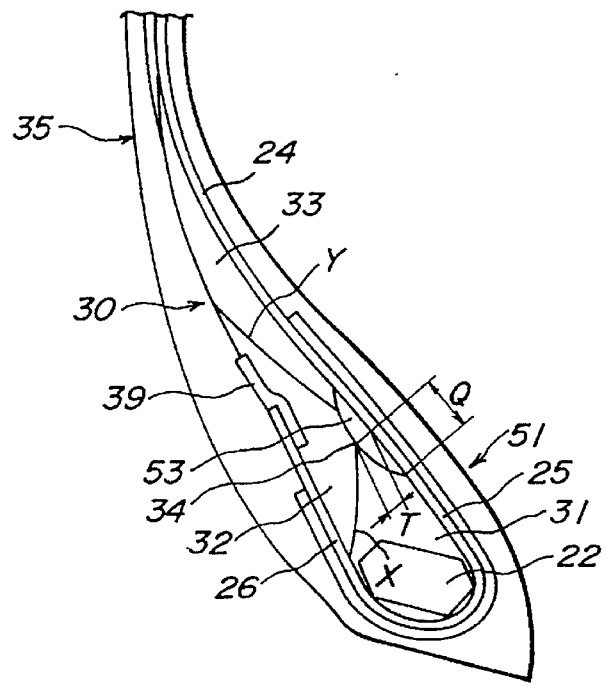
FIG. 4 is a schematically radial section view of a second embodiment of the bead portion in the pneumatic radial tire according to the invention.

Moreover, when the tire 21 is run under a heavy loading, deformation based on running is repeatedly caused in the inside of the first stiffener member 31 and becomes maximum at the outer end 34 of the first stiffener member 31 in the radial direction (which is the same as the outer end X2 in the radial direction). When the outer end X2 of the boundary surface X contacts with the main body 25, there is a fear of generating separation failure at the contacting position by shearing strain based on the above deformation. In order to prevent the occurrence of such a separation, a cushion rubber layer 53 made from rubber having a hardness lower than that of the first stiffener member 31 is arranged between the outer end region of the first stiffener member 31 in the radial direction and the main body 25 of the carcass ply as shown in FIG. 4 as a second embodiment. As a result, the outer end region of the first stiffener member 31 in the radial direction is separated away outward from the main body 25 in the axial direction through the cushion rubber layer 53 at a given distance. Thus, the shearing strain based on the above deformation is dispersed and absorbed by the easily deformable cushion rubber layer 53. Consequently, the shearing strain generated between the outer end region of the first stiffener member 31 in the radial direction and the main body 25 is reduced to effectively prevent the occurrence of separation failure at such a position. Moreover, it is favorable that the cushion rubber layer 53 has a sufficient thickness at a position contacting with the outer end 34 of the first stiffener member 31 in the radial direction and the thickness thereof is gradually thinner from this position toward the inside and outside in the radial direction. In the second embodiment, the inner portion of the ply end rubber member 39 in the radial direction is closely arranged onto the outer end region of the turnup portion 26 in the radial direction at the inside thereof in the axial direction. The outer portion of the ply end rubber member in the radial direction is closely arranged onto the second stiffener member 32 outward from the turnup portion 26 in the radial direction as shown in FIG. 4. The amount of expensive rubber used in the ply end rubber member 39 can be therefore decreased and the tire building operation can be facilitated.

In the second embodiment, the distance Q from the inner end of the cushion rubber layer 53 in the radial direction to the outer end 34 of the first stiffener member 31 along the main body 25 is within a range of 3–20 mm because the shearing strain can effectively be controlled without badly affecting the tire properties. When the distance Q is less than 3 mm, shearing strain can not sufficiently be mitigated. When it exceeds 20 mm, the cushion rubber layer 53 having a hardness lower than that of the first stiffener member 31 is extended to the vicinity of the bead core 22, so that the deformation of pulling the carcass ply 24 due to the rotation of the bead core 22 in the inflation under the internal pressure is increased and further promoted by repetitive fatigue during the running under loading to easily generate separation failure from the outer end region of the turnup portion 26 in the radial direction. On the other hand, the thickness T of the cushion rubber layer 53 on a normal line to the main body 25 passing through the outer end 34 of the first stiffener member 31 in the radial direction is within a range of 1–10 mm because the shearing strain can effectively be controlled without adversely affecting the tire properties. When the thickness T is less than 1 mm, the shearing strain can not be sufficiently mitigated. When it exceeds 10 mm, the volume of the cushion rubber layer 53 having a hardness lower than that of the first stiffener member 31 is relatively increased to lower the rigidity of the bead portion 51 as a whole. Moreover, the other construction and function of the second embodiment are the same as in the first embodiment except for numerical values shown in Table 1.

Figure 5:
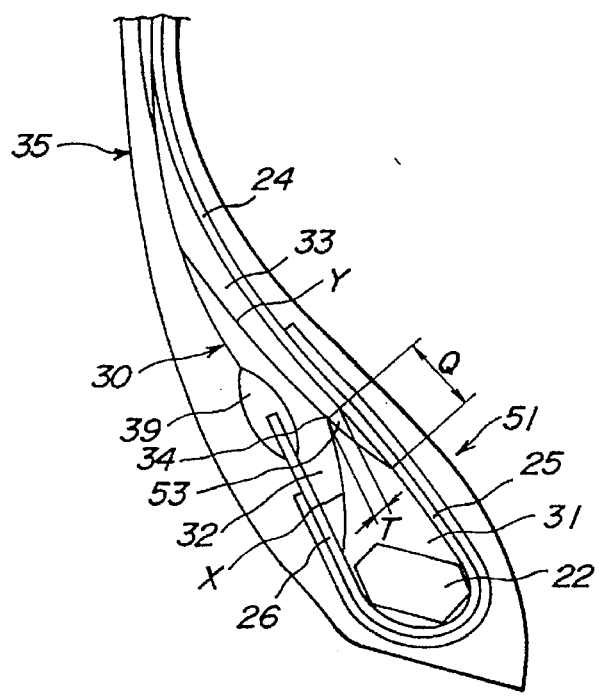
FIG. 5 is a schematically radial section view of a third embodiment of the bead portion in the pneumatic radial tire according to the invention.

FIG. 5 illustrates a third embodiment of the tire according to the invention. In this embodiment, the cushion rubber layer 53 is made from the same rubber as used in the third stiffener member 33, so that the third stiffener member 33 has apparently such a form that the third stiffener member 33 extends inwardly in the radial direction and is interposed between the outer end region of the first stiffener member 31 in the radial direction and the main body 25 of the carcass ply. In this case, the operation of sticking rubber as the cushion rubber layer 53 is useless and the tire building operation is easy. Moreover, the other construction and function of the third embodiment are the same as in the first embodiment except for numerical values shown in Table 1.

FIG. 6 shows a fourth embodiment of the tire according to the invention. In this embodiment, the ply end rubber member 39 is made from rubbers arranged on the outer end region of the turnup portion 26 in the radial direction at outside and inside thereof in the axial direction, while the outer end 40 of the ply end rubber member 39 in the radial direction is matched with the outer end 36 of the turnup portion 26 in the radial direction. Thus, the amount of expensive rubber used in the ply end rubber member 39 can be reduced. Moreover, the remaining construction and function of the fourth embodiment are the same as in the first embodiment except for numerical values shown in Table 1.

FIG. 7 shows a fifth embodiment of the tire according to the invention. In this embodiment, a few textile chafers (two textile chafers 55, 56 in the illustrated embodiment) are arranged outside the turnup portion 26 in the axial direction to extend along the turnup portion 26 and cover the outer end 36 of the turnup portion 26 in the radial direction, and contain a plurality textile cords therein, respectively. The inner textile chafer 55 is arranged to cover the bead core 22, while the outer textile chafer 56 is arranged to cover the whole of the turnup portion 26. Such an arrangement of the textile chafers 55, 56 further improves the bead portion durability. Moreover, the outer ends 57 of the textile chafers 55, 56 are located inward from the outer end Y1 of the boundary surface Y between the second and third stiffener members 32, 33 in the radial direction. That is, the outer ends 57 of the textile chafers 55, 56 in the radial direction are separated away from the third stiffener member 33 causing the large flow deformation outward in the radial direction to prevent the formation of a trouble nucleus in the outer ends 57 of the textile chafers 55, 56 in the radial direction under the influence of the flow deformation. The outer end of the textile chafer in the radial direction means an outer end of a textile chafer located at a highest side in the radial direction even when the plural textile chafers are arranged along the turnup portion. In the illustrated embodiment, a distance in radial direction N measured from the outer end Y1 of the boundary surface Y to the outer end 57 in the radial direction along the textile chafer 56 is +5 mm (the distance inward in the radial direction is +) as shown in Table 2, while the radial distance to the outer end 38 of the third stiffener member 33 in the radial direction is 1.05 times of the height H of the maximum carcass width. Moreover, the other construction and function of the fifth embodiment are the same as in the first embodiment except for numerical values shown in Table 2.

First test example

Figure 12:
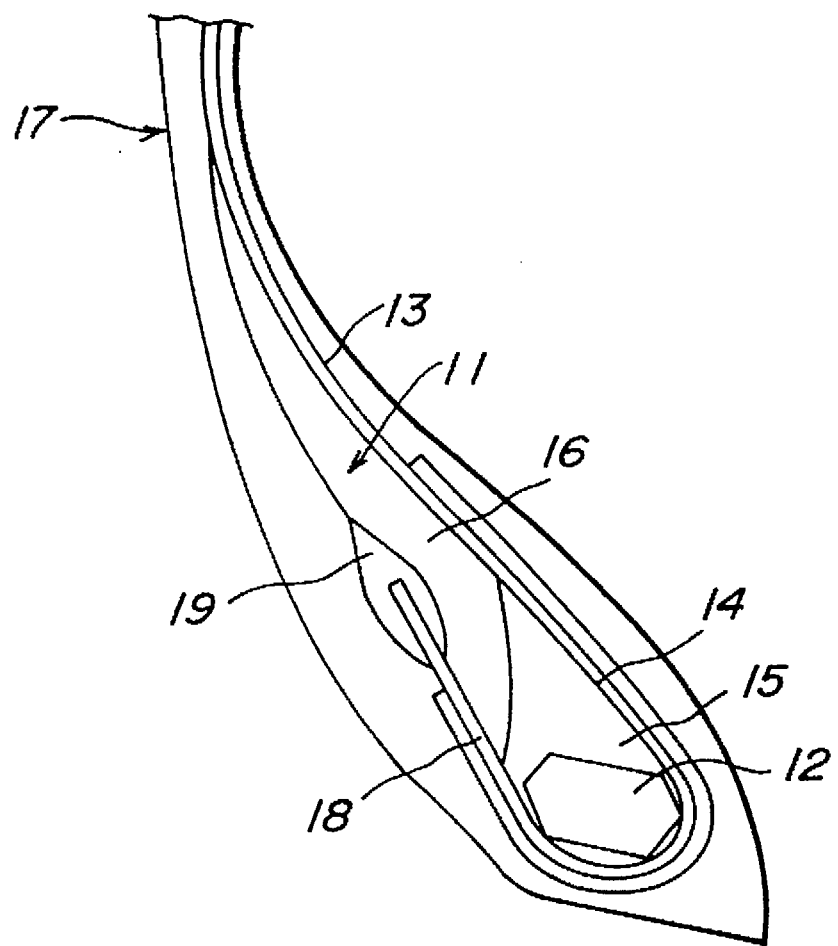
FIG. 12 is a schematically radial section view of the bead portion in the conventional pneumatic radial tire.

In this test, there are provided conventional tires 1 and 2 having a structure as shown in FIG. 12, an acceptable tire 1 having a structure as shown in FIG. 1, an acceptable tire 2 having a structure as shown in FIG. 4, an acceptable tire 3 having a structure as shown in FIG. 5, an acceptable tire 4 having a structure as shown in FIG. 6, an acceptable tire 5 having a structure as shown in FIG. 8, and a comparative tire 1 having a structure as shown in FIG. 9. These tires have a tire size of 11/70R22.5, and the volume percentages and the like in the acceptable tires 1–5 and the comparative tire 1 are shown in Table 1.

TABLE 1

|  | Acceptable tire 1 | Acceptable tire 2 | Acceptable tire 3 | Acceptable tire 4 | Acceptable tire 5 | Comparative tire 1 |
| --- | --- | --- | --- | --- | --- | --- |
| Volume percentage J (%) | 23 | 38 | 36 | 23 | 30 | 45 |
| Volume ratio B/C | 1.95 | 0.85 | 0.85 | 2.0 | 1.25 | 0.58 |
| L/K | 4.0 | 3.0 | 5.6 | 3.0 | 2.4 | 1.20 |
| Hardness of cushion rubber layer (°) | — | 60 | 49 | — | — | — |
| Distance Q (mm) | — | 10 | 15 | — | — | — |
| Thickness T (mm) | — | 3.0 | 3.0 | — | — | — |

In the conventional tire 1, the hard stiffener 15 has a Shore A hardness of 84°, the soft stiffener 16 has a Shore A hardness of 63°, and the ply end rubber member 19 has a Shore A hardness of 68°. In the conventional tire 2, the hard stiffener 15 has a Shore A hardness of 84°, the soft stiffener 16 has a Shore A hardness of 49°, and the ply end rubber member 19 has a Shore A hardness of 68°. The other structure of the conventional tires 1 and 2 is the same as in the tire of the first embodiment. As seen from Table 1, the acceptable tire 5 is a tire in which the volume percentage J of the third stiffener member 33 is increased by shifting the outer end Y1 of the boundary surface Y inward in the radial direction. The comparative tire 1 is a tire in which the outer end Y1 of the boundary surface Y in the radial direction is largely shifted inward in the radial direction to locate inward from the outer end 40 of the ply end rubber member 39 in the radial direction or contact with a central region of the ply end rubber member 39. The other structure in the acceptable tire 5 and the comparative tire 1 is the same as in the tire of the first embodiment.

Each of these tires is inflated under an internal pressure of 8.5 kgf/cm$^2$ and run on a drum at a speed of 60 km/h under loading of 5000 kgf, during which a running distance until breakage of the bead portion is measured and represented by an index value on the basis that the conventional tire 1 is 100 at a time of generating separation failure in the outer end of the turnup portion in the radial direction. In the conventional tire 2, the separation failure is generated by an index value of 102. On the other hand, the separation failure is not generated up to an index value of 123 in the acceptable tire 1, an index value of 138 in the acceptable tire 2, an index value of 140 in the acceptable tire 3, an index value of 121 in the acceptable tire 4, and an index value of 130 in the acceptable tire 5. Moreover, the separation is somewhat generated in the outer end of the turnup portion in the radial direction after the completion of the test in the acceptable tire 5. In the comparative tire 1, the separation is generated at the outer end of the turnup portion in the radial direction in the index value 105, while cracking is observed in the boundary surface Y between the second and third stiffener members.

Second test example

In this test, there are provided a conventional tire 3 having a structure as shown in FIG. 10, an acceptable tire 6 having a structure as shown in FIG. 7, and a comparative tire 2 having a structure as shown in FIG. 11. Each of these tires has a tire size of 11/70R22.5, and the volume percentage J and the like in the acceptable tire 6 and the comparative tire 2 are shown in Table 2.

TABLE 2

|  | Acceptable tire 6 | Comparative tire 2 |
| --- | --- | --- |
| Volume percentage J (%) | 28 | 36 |
| Volume ratio B/C | 1.57 | 1.00 |
| L/K | 5.0 | 2.6 |
| Distance in radial direction N (mm) | +5 | −15 |

The conventional tire 3 is a tire in which the stiffener 11 is composed of hard stiffener 15 and soft stiffener 16 formed by uniting the second and third stiffener members 32, 33 in the tire of FIG. 7 together so as to have the same hardness as in the second stiffener member 32 (Shore A hardness: 63°), and has the same structure as in the tire of the fifth embodiment. As seen from Table 2, the comparative tire 2 is a tire in which the outer end Y1 of the boundary surface Y is shifted inward in the radial direction to locate inward from the outer end 57 of the textile chafer 56 by 15 mm, and has the same structure as shown in the tire of the fifth embodiment.

Next, each of these tires is tested under the same test conditions as in the first test example. As a result, the conventional tire 3 generates a separation failure at the outer end of the turnup portion in the radial direction in an index value of 100, while the acceptable tire 6 does not generate the separation failure up to an index value of 128. On the other hand, the comparative tire 2 generates a separation failure at the outer end of the textile chafer in the radial direction in an index value of 106.

In the third embodiment, the third stiffener member 33 is extended inward in the radial direction and interposed between the outer end region of the first stiffener member 31 in the radial direction and the main body 25. On the other hand, the first stiffener member 31 may be extended outward in the radial direction to be interposed between the inner end region of the third stiffener member 31 in the radial direction and the main body 25. Furthermore, the number of the textile chafers may be one or three.

As mentioned above, according to the invention, the occurrence of cracking based on the deflective deformation and torsional deformation during the running under loading and the flow deformation in the inflation under internal pressure can effectively be controlled, whereby the bead portion durability can surely be improved.

What is claimed is:

1. A pneumatic radial tire comprising; a pair of bead cores, at least one radial carcass ply comprised of a main body extending between the bead cores and a turnup portion wound around each bead core from inside toward outside, a stiffener arranged between the main body and the turnup portion of a radially outermost carcass ply and extending from each bead core along the main body outward in substantially a radial direction of the tire, said stiffener composed of first, second and third stiffener members successively arranged from inside toward outside in the radial direction and made from rubbers being lower in hardness in this order, and a boundary surface X between the first and second stiffener members being inclined outward in the radial direction to approach to the main body and a boundary surface Y between the second and third stiffener members being inclined outward in the radial direction to separate away from the main body, and a ply end rubber member made from rubber having a hardness between the hardnesses of the first and third stiffener members arranged on an outer end region of the turnup portion in the radial direction, and an outer end Y1 of the boundary surface Y between the second and third stiffener members in the radial direction being located outward from an outer end of the ply end rubber member in the radial direction and an inner end X1 of the boundary surface X between the first and second stiffener members in the radial direction being located inward from an outer end of the turnup portion in the radial direction.

2. A pneumatic radial tire according to claim 1, wherein a length L along the boundary surface y between the second and third stiffener members is not less than 2.0 times a normal distance K from the midpoint of the outer end of the turnup portion in the radial direction to the midpoint of the main body of the radially outermost carcass ply.

3. A pneumatic radial tire according to claim 1, wherein the outer end of the third stiffener member in the radial direction is located outward from a point P on the radially outermost carcass ply main body corresponding to 0.8 times a height H of a maximum width of the radially outermost carcass ply in the inflated condition under a normal internal pressure.

4. A pneumatic radial tire according to any one of claims 1-3, wherein a Shore A hardness of the first stiffener member is not less than 70°, and that of the second stiffener member is within a range of 58° to 68°, and that of the third stiffener member is more than 55°.

5. A pneumatic radial tire according to claim 4, wherein a ratio of volume of the second stiffener member to volume of the third stiffener member is within a range of 0.8–2.5.

6. A pneumatic radial tire according to claim 5, wherein a few textile chafers are arranged outward on the turnup portion in an axial direction to cover the outer end of the turnup portion in the radial direction along the turnup portion, and an outer end of any textile chafer in the radial direction is located inward from the outer end Y1, of the boundary surface Y between the second and third stiffener members in the radial direction.

7. A pneumatic radial tire according to claim 4, wherein a few textile chafers are arranged outward on the turnup portion in an axial direction to cover the outer end of the turnup portion in the radial direction along the turnup portion, and an outer end of any textile chafer in the radial direction is located inward from the outer end Y1 of the boundary surface Y between the second and third stiffener members in the radial direction.

8. A pneumatic radial tire according to claim 1, wherein a volume occupying percentage J of the third stiffener member in the stiffener is not less than 10%.

9. A pneumatic radial tire according to any one of claims 1–3 and 8, wherein a ratio of volume of the second stiffener member to volume of the third stiffener member is within a range of 0.8–2.5.

10. A pneumatic radial tire according to claim 9, wherein a few textile chafers are arranged outward on the turnup portion in an axial direction to cover the outer end of the turnup portion in the radial direction along the turnup portion, and an outer end of any textile chafer in the radial direction is located inward from the outer end Y1 of the boundary surface Y between the second and third stiffener members in the radial direction.

11. A pneumatic radial tire according to claim 1, wherein a cushion rubber layer having a hardness lower than that of the first stiffener member is arranged between the main body of the radically outermost carcass ply and the outer end region of the first stiffener member in the radial direction.

12. A pneumatic radial tire according to claim 11, wherein the cushion rubber layer is made from the same rubber as used in the third stiffener member and the third stiflenet member is extended inward in the radial direction and interposed between the main body of the radially outermost carcass ply and the outer end region of the first stiffener member in the radial direction.

13. A pneumatic radial tire according to claim 11, wherein a distance Q from an inner end of the cushion rubber layer to the outer end of the first stiffener member along the main body of the radially outermost carcass ply in the radial direction is within a range of 3–20 mm.

14. A pneumatic radial tire according to claim 12, wherein a distance Q from an inner end of the cushion rubber layer to the outer end of the first stiffener member along the main body of the radially outermost carcass ply in the radial direction is within a range of 3–20 mm.

15. A pneumatic radial tire according to any one of claims 11–13, wherein a thickness T of the cushion rubber layer is within a range of 1–10 mm between the main body and the outer end of the first stiffener member in the radial direction.

16. A pneumatic radial tire according to claim 15, wherein a few textile chafers are arranged outward on the turnup portion in an axial direction to cover the outer end of the turnup portion in the radial direction along the turnup portion, and an outer end of any textile chafer in the radial direction is located inward from the outer end Y1 of the boundary surface Y between the second and third stiffener members in the radial direction.

17. A pneumatic radial tire according to claim 1, wherein the outer end of the turnup portion in the radial direction is located in a central region of the second stiffener member in the radial direction.

18. A pneumatic radial tire according to claim 1, wherein the outer end of the ply end rubber member in the radial direction is matched with the outer end of the turnup portion in the radial direction.

19. A pneumatic radial tire according to any one of claims 1–3, 8, 11–13, 17–18, wherein a few textile chafers are arranged outward on the turnup portion in an axial direction to cover the outer end of the turnup portion in the radial direction along the turnup portion, and an outer end of any textile chafer in the radial direction is located inward from the outer end Y1 of the boundary surface Y between the second and third stiffener members in the radial direction.

* * * * *